Patented May 20, 1924.

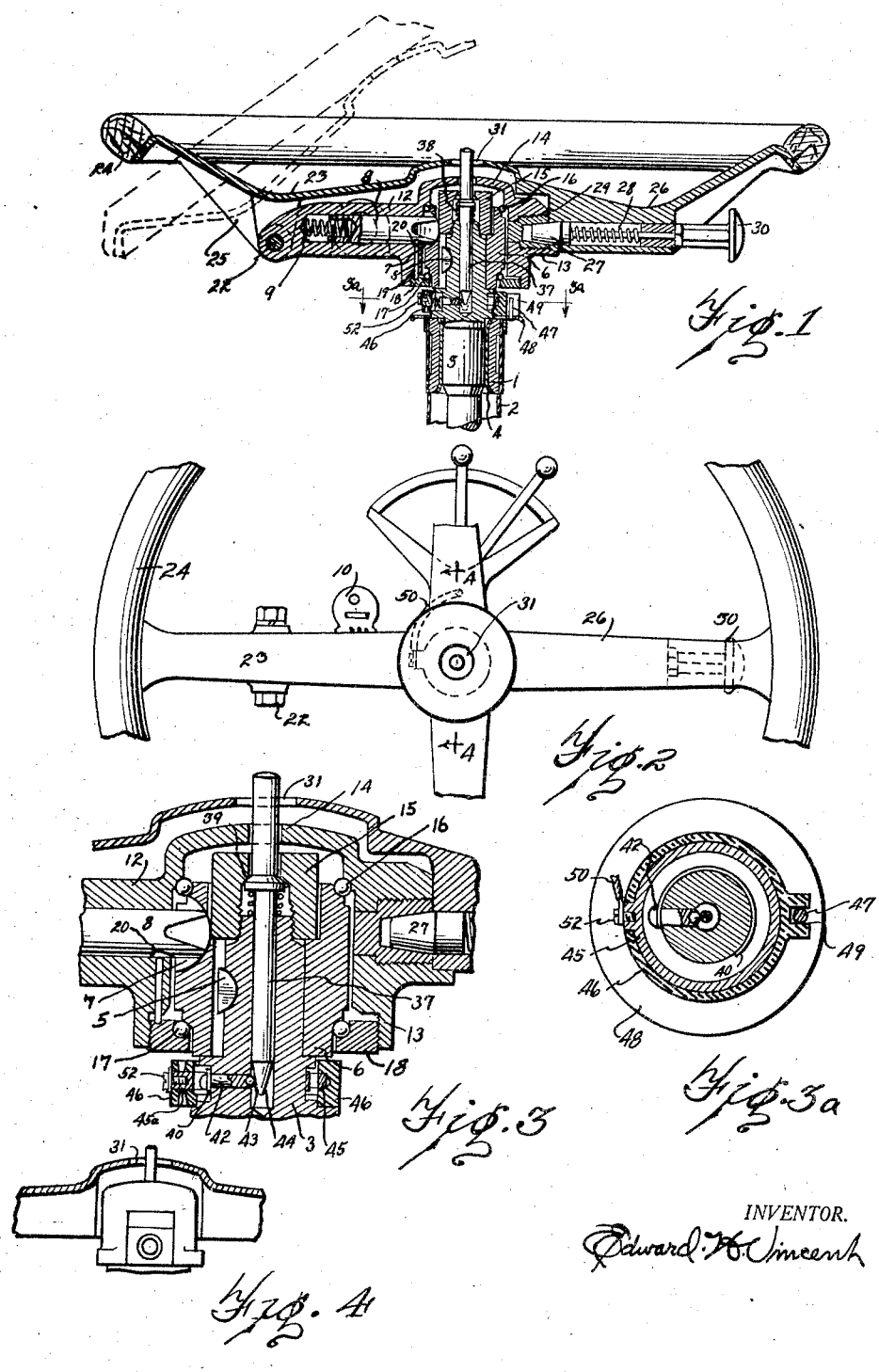

1,494,515

UNITED STATES PATENT OFFICE.

EDWARD H. VINCENT, OF DETROIT, MICHIGAN.

STEERING WHEEL.

Original application filed September 7, 1922, Serial No. 586,688. Divided and this application filed June 11, 1923. Serial No. 644,706.

*To all whom it may concern:*

Be it known that I, EDWARD H. VINCENT, a citizen of the United States, and residing at Detroit, in the county of Wayne and State of Michigan, have invented a new and Improved Steering Wheel, of which the following is a specification.

This invention relates to steering wheels for automobiles, particularly to that type which embodies a hub portion adapted to be locked to and unlocked from the steering shaft of the vehicle, and a rim and spider portion pivoted on the hub portion, and its object is to provide a steering wheel of this character which shall be of great strength, which shall be simple in construction, and wherein the horn actuating member shall be mounted adjacent the upper end of a steering shaft and the electric contacts operated by the horn actuating member shall also be mounted adjacent the upper end of said shaft, removal of the actuating member and electric contacts being controlled by a key operated lock.

Another object of the invention is to provide a spider adapted to cover the wheel head or hub portion, the spider having an opening through which the horn actuating member extends and is operable when the wheel spider is in operative position on the wheel head. The spider might also be of the non-tilting type and secured rigidly to the wheel head.

In the accompanying drawings, Fig. 1 is a vertical section of the steering wheel embodying this invention. Fig. 2 is a plan thereof. Fig. 3 is an enlarged vertical section of the steering wheel hub shown in Fig. 1. Fig. 3ª is a section on the line 3ª—3ª of Fig. 1. Fig. 4 is a section on the line 4—4 of Fig. 2.

The structure shown in Figs. 1 and 2 is similar to that shown in Figs. 1 and 2 of my pending application Serial Number 586,688, filed September 7, 1922, and Figs. 3 and 3ª are reproductions of Figs. 3 and 3ª of said application, and this present application is a division thereof.

Similar reference characters refer to like parts throughout the several views.

A bushing 1 at the upper end of the tubular steering post 2 constitutes a bearing for the steering shaft 3, an anti-friction lining 4 being provided if desired. On this steering shaft and secured thereto by a key 5 is a hard steel bushing 6 which is formed with a notch 7 to receive the locking bolt 8. This locking bolt is normally held inward by means of a spring 9 but may be withdrawn by means of a key 10. The particular construction used to connect the lock which is controlled by this key 10 to the bolt 8 is not shown, as it forms no part of the present invention.

This bolt 8 and the lock which operates it are mounted in an arm 12 extending from the hard steel hub 13 of the steering wheel head. This hub has a central cap portion 14 which extends over the nut 15 by means of which the bushing 6 is held in position on the shaft 3. Bearing balls 16 are positioned between recesses formed within the hub 13 and at the upper end of the bushing 6 and other bearing balls 17 are in recesses formed in the bushing 6 and in a hard steel nut 18 which screws up into the hub. This nut is normally prevented from turning by means of a pin 19 which extends into notches in this nut but which pin is permitted to move up and down by reason of the notch 20 in the locking bolt 8 when that locking bolt is in operative position. When, however, the locking bolt is withdrawn so that the wheel can spin freely on the bushing 6, then this notch is no longer over the pin 19 and the bolt therefore will prevent the nut 18 from being turned back to permit the removal of the steering wheel head from the bushing 6.

The arm 12 carries a pin 22 on which one of the arms 23 of the spider of the steering wheel is mounted, the rim 24 connecting to the ends of the arms in the usual manner. The arm 23 is provided with sides 25 through which the pin 22 extends and which enclose the arm 12 on the hub except at that point where the key 10 is introduced, at which point the one side 25 has a notch. These details are not illustrated as they form no part of the present invention.

The arm 26 which is opposite the arm 23 carries a locking pin 27 normally held inwardly by a spring 28 to engage in the bushing 29 mounted in the hub 13. This pin can be withdrawn by means of the button 30 so as to permit the wheel rim and spider to be swung up to the position shown in dotted lines in Fig. 1.

Slidably mounted in the upper end of the shaft 3 is a hard steel stem 37 which is normally held upward by means of a spring 38 as shown in Figs. 1 and 3. The construction of this device is more clearly shown in Fig. 3, the stem being formed with a shoulder 39 to limit its upward movement. This stem 37 may rotate with or independently of the steering shaft 3. It is conceivable that a wedge could be driven in between the stem 37 and the wall of the opening in the top 14 of the hub 13 and that thereby the steering shaft 3 might be turned. By having this stem freely rotatable, a wedge driven in between it and the edge of the opening would merely cause the stem to turn without turning the shaft. This spider is provided with a central opening 31 through which the upper end of the actuating member or stem 37 extends and the opening is of sufficient size to provide proper clearance with respect to the stem whereby the spider may be tilted to operative or inoperative positions independent of the stem. It is evident that the stem might be constructed in two or more parts whereby the upper part of the stem could be carried by the hub portion 14. Mounted in the lower end of the bushing 6 and normally held inward by the spring 40 is a contact pin 42 which may have a ball 43 mounted in its inner end to contact with the tapering end 44 of the stem 37. The pin 42 is forced out when the stem 37 is depressed until this pin contacts with the contact ring 45 mounted in a collar 46 of insulating material, this collar being loosely mounted on the steering shaft 3 and being prevented from turning therewith by the pin 47 carried by the flange 48 at the upper end of the steering column, which pin extends between the lugs 49 on this collar to keep it from turning. The removal of the collar 46 and pin 42 from the shaft 3 is prevented by the hub 13 and bushing 6. The conductor wire 50 may be attached to the contact ring 45 by means of a screw 52 which extends into a boss 45ª on this ring. The steering wheel is grounded and as one side of the battery is grounded, depression of the stem 37 will cause the pin 42 to complete a circuit between the wire 50 and the grounded steering mechanism. This wire 50 extends to the horn of the vehicle. It will therefore be noted that the steering wheel is pivoted on a wheel head and can be swung up to give more clearance at the steering column.

The details and proportions, however, of the various parts of this construction may all be changed by those skilled in the art without departing from the spirit of my invention as set forth in the following claims.

I claim:—

1. In a steering wheel, a shaft, a head mounted thereon, a wheel spider mounted on said head, electrical contacts, and means for operating one of said contacts, said means extending through an opening in the head. the spider having an opening through which said means also extends.

2. In a steering wheel, a shaft, a wheel head mounted thereon, a wheel spider movable to operative or inoperative positions on the head and having an opening and adapted to cover said wheel head, normally disengaged electrical means, and manually operable means adapted to extend into said spider opening for causing the engagement of said electrical means, the opening in said spider providing clearance with respect to said manually operable means whereby said spider may be moved to operative or inoperative positions.

3. In a steering wheel, a shaft, a head mounted thereon, a wheel spider mounted on said head, electrical contacts carried by said shaft below said head, and means for operating one of said contacts, said means extending through an opening in the head.

4. In a steering wheel, a shaft, a head mounted thereon, a wheel spider mounted on said head, electrical contacts carried by said shaft below said head, and means for operating one of said contacts, said means extending through an opening in the upper portion of said head.

5. In a steering wheel, a shaft, a head mounted thereon, a wheel spider mounted on said head and having a portion overlying the upper surface of said head, electrical contacts below said head, and means for operating one of said contacts, an opening in the upper surface of said head and also in the portion of the spider overlying said head, said means extending through said openings in said head and wheel spider respectively.

6. In a steering wheel, a wheel head having a hub, a wheel spider movable to operative or inoperative positions on the head and having a portion which covers said hub when said spider is in operative position, an opening in the spider portion which covers said hub, normally disengaged electrical contact means, and movable means extending through said spider opening when the latter is in operative position to cause the engagement of said electrical contact means. the opening in said spider portion providing clearance for said movable means whereby said spider may be moved to operative or inoperative positions.

7. In a steering wheel, a shaft, a head mounted thereon, a wheel spider movable to operative or inoperative positions on the head and having a central portion overlying the upper central surface of said head, electrical contacts below said head, and means for operating one of said contacts, an opening in the upper central surface of said head and also in the central portion of the spider overlying said head, said means extending through said opening in said head and being operable through said opening in said spider.

8. In a steering wheel, a shaft, a head mounted thereon, a wheel spider tiltable to operative or inoperative positions on the head and having a central portion overlying the upper central surface of said head, electrical contacts below said head, and means for one of said contacts, a circular opening in the upper central surface of said head and an opening in the central portion of the spider overlying said head, said means extending through said circular opening in said head and being operable through said opening in said spider.

9. In a steering wheel, a shaft, a head mounted thereon, a wheel spider movable to operative or inoperative positions on the head and having a central portion overlying the upper central surface of said head, electrical contacts below said head, and means for operating one of said contacts, a circular opening in the upper central surface of said head and an opening in the central portion of the spider overlying said head, said means extending through said circular opening in said head and being operable through said opening in said spider when said spider is in operative position on the head.

10. In a steering wheel, a shaft, a head mounted thereon, a wheel spider movable to operative or inoperative positions on the head and having a portion overlying said head, electrical contacts, and means for operating one of said contacts, an opening in said head and also in the portion of the spider overlying said head, said means extending through said openings in said head and wheel spider respectively and projecting above the portion of the spider overlying said head, the opening in said spider providing clearance with respect to said operating means so that said spider may be moved to operative or inoperative positions.

11. In a steering wheel, a shaft, a head mounted thereon, a wheel spider movable to operative or inoperative positions on the head and having a section extending beyond said head, electrical contacts, and means for operating one of said contacts, an opening in the head and also in the spider section extending beyond said head, said means extending through said openings in said head and wheel spider respectively and projecting beyond said spider section, the opening in said spider section providing clearance with respect to said operating means so that said spider may be moved to operative or inoperative positions.

12. In a steering wheel, a shaft, a head mounted thereon, a wheel spider tiltable to operative or inoperative positions on the head and having a section overlying said head, electrical contacts, and means for operating one of said contacts and arranged axially of said shaft, an opening in the head and also in the spider section overlying the head, said opening in the head arranged axially of said shaft, said means extending through said openings in said head and wheel spider respectively and projecting above the spider section overlying said head, the opening in said spider section providing clearance with respect to said operating means so that said spider may be tilted to operative or inoperative positions.

13. In a steering wheel, a shaft, a wheel hub removably mounted on the upper end thereof, electric contacts adjacent the upper end of said shaft and held against removal therefrom by said wheel hub, and locking means to prevent removal of said wheel hub from said shaft.

14. In a steering wheel, a rotatable shaft, a wheel hub removably mounted on the upper end thereof, electric contacts, means to operate said contacts, said contacts and said operating means mounted adjacent the upper end of said shaft and held against removal therefrom by said wheel hub, and locking means to allow or prevent removal of said wheel hub from said shaft.

15. In a steering wheel, a rotatable shaft, a bushing removably mounted on the upper end thereof, a nut connected to said shaft to prevent removal of the bushing from said shaft, a wheel hub mounted on said bushing and preventing removal of said nut and said bushing from the shaft, electric contacts and means to operate said contacts mounted adjacent the upper end of said shaft, said operating means held against removal by said nut, said contacts held against removal by said hub and said bushing, and means to control the removal of said hub from said bushing.

16. In a steering wheel, a shaft, a wheel head mounted thereon and having a hub, a wheel spider movable to operative or inoperative positions on the head and having a portion adapted to cover said hub, an opening in the spider portion which covers said hub, electrical contacts, and movable means extending from said hub and through said spider opening to operate said contacts, the opening in said spider portion providing clearance with respect to said operating means whereby said wheel spider may be moved to operative or inoperative positions.

17. In a steering wheel, a shaft, a wheel head mounted thereon and having a hub, a wheel spider tiltable to operative or inoperative positions on the head and having a hollow chamber adapted to cover said hub, an opening in a portion of the chamber which covers said hub, electrical contacts, and a movable member projecting from said hub and through said spider opening to operate one of said contacts, the opening in said spider chamber providing clearance with respect to said operating member whereby said wheel spider may be tilted to operative or inoperative positions.

18. In a steering wheel, a shaft, a head mounted thereon, a wheel spider movable to operative or inoperative positions on the head and having a portion adapted to cover said head, an opening in said spider portion, a stationary contact, a slidable contact adapted to be moved to engage said stationary contact, and an operating member for said slidable contact projecting from said head and adapted to extend through said spider opening and beyond the spider portion which covers said head, the opening in said spider portion providing clearance with respect to said operating member whereby said wheel spider may be moved to operative or inoperative positions.

19. In a steering wheel, a shaft, a head mounted thereon, a wheel spider movable to operative or inoperative positions on the head and having a surface adapted to cover said head, an opening in said spider surface, electrical contacts, and operating means for said contacts projecting from said head and being operable through said spider opening when said spider is in operative or partial inoperative positions on the head, the operation of said means being independent of said spider opening when said spider is moved to its full inoperative position.

20. In a steering wheel, a shaft, a head mounted thereon, a wheel spider movable to operative or inoperative positions on the head and having a portion covering said head when the wheel spider is in operative position, an opening in said spider portion, normally disengaged electrical contact means, and operating means for said electrical contact means and being operable through said spider opening when said spider is in operative position on the head, the operation of said operating means being independent of but impossible through said spider opening when said spider is moved to its full inoperative position on the head.

21. In a steering wheel, a shaft, a head mounted thereon, a wheel spider swingable to operative or inoperative positions on the head and having a portion adapted to cover said head, an opening in said spider portion, normally disengaged electrical contact means, and operating means for causing the engagement of said electrical contact means and being movable through said spider opening when said spider is in operative position on the head, the movement of said operating means being independent of but impossible through said spider opening when said spider is swung to its full inoperative position on the head, the opening in said spider portion also serving to provide clearance for said operating means whereby said spider may be swung to operative or inoperative positions on the head.

EDWARD H. VINCENT.